(12) United States Patent
Buzzard et al.

(10) Patent No.: US 8,978,510 B2
(45) Date of Patent: Mar. 17, 2015

(54) STEERING COLUMN TELESCOPE AND E/A LOCKING DEVICE

(71) Applicants: Donald A. Buzzard, Saginaw, MI (US); Melvin Lee Tinnin, Clio, MI (US); Michael P. Anspaugh, Bay City, MI (US)

(72) Inventors: Donald A. Buzzard, Saginaw, MI (US); Melvin Lee Tinnin, Clio, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 107 days.

(21) Appl. No.: 13/767,376

(22) Filed: Feb. 14, 2013

(65) Prior Publication Data

US 2013/0205935 A1    Aug. 15, 2013

Related U.S. Application Data

(60) Provisional application No. 61/599,268, filed on Feb. 15, 2012.

(51) Int. Cl.
| | |
|---|---|
| *B62D 1/18* | (2006.01) |
| *B62D 1/184* | (2006.01) |
| *B62D 1/19* | (2006.01) |

(52) U.S. Cl.
CPC ..................................... *B62D 1/184* (2013.01)
USPC ................. 74/493; 74/495; 280/775; 280/777

(58) Field of Classification Search
CPC ........ B62D 1/184; B62D 1/185; B62D 1/187; B62D 1/192; B60R 25/021; B60R 25/0211; B60R 25/02113; B60R 25/02134; B60R 25/02136; B62H 5/02

USPC .............. 70/182–184, 186–189; 74/493, 495; 280/775, 777

See application file for complete search history.

(56) References Cited

U.S. PATENT DOCUMENTS

| | | | | |
|---|---|---|---|---|
| 4,463,625 | A * | 8/1984 | Nishikawa | 74/493 |
| 4,793,204 | A * | 12/1988 | Kubasiak | 74/493 |
| 5,029,489 | A * | 7/1991 | Burmeister et al. | 74/493 |
| 5,503,431 | A * | 4/1996 | Yamamoto | 280/777 |
| 5,524,927 | A * | 6/1996 | Toussaint | 280/777 |
| 5,562,307 | A * | 10/1996 | Connor | 280/777 |
| 5,787,759 | A * | 8/1998 | Olgren | 74/493 |
| 5,820,163 | A * | 10/1998 | Thacker et al. | 280/775 |
| 6,139,057 | A * | 10/2000 | Olgren et al. | 280/775 |
| 6,419,269 | B1 * | 7/2002 | Manwaring et al. | 280/775 |
| 7,574,941 | B2 * | 8/2009 | Manwaring et al. | 74/492 |
| 7,635,149 | B2 * | 12/2009 | Menjak et al. | 280/775 |
| 7,685,903 | B2 * | 3/2010 | Streng et al. | 74/493 |
| 7,735,868 | B2 * | 6/2010 | Ridgway et al. | 280/775 |

(Continued)

*Primary Examiner* — Paul N Dickson
*Assistant Examiner* — Laura Freedman
(74) *Attorney, Agent, or Firm* — Cantor Colburn LLP

(57) ABSTRACT

A locking device for a steering column is provided. The locking device includes an operating lever configured to rotate between a first position and a second position, an actuating body configured to rotate in response to rotation of the operating lever and a locking cam operably connected to the actuating body and rotatable between a locked position and an unlocked position in response to rotation of the actuating body. The locking cam includes an eccentric locking surface having a plurality of locking teeth. A locking segment is positioned adjacent to the locking cam, the locking segment having a plurality of segment teeth formed thereon. A shaft extends along a first axis and the actuating body and locking cam are positioned on the shaft and configured to rotate about the first axis.

19 Claims, 8 Drawing Sheets

(56) References Cited

U.S. PATENT DOCUMENTS

| | | | |
|---|---|---|---|
| 7,861,615 B2* | 1/2011 | Harris et al. | 74/493 |
| 8,375,822 B2* | 2/2013 | Ridgway et al. | 74/493 |
| 8,500,168 B2* | 8/2013 | Goulay et al. | 280/777 |
| 8,657,338 B2* | 2/2014 | Buzzard et al. | 280/775 |
| 8,783,717 B2* | 7/2014 | Tinnin et al. | 280/777 |
| 2006/0230863 A1* | 10/2006 | Rouleau et al. | 74/492 |
| 2006/0273568 A1* | 12/2006 | Manwaring et al. | 280/777 |
| 2008/0236325 A1* | 10/2008 | Ridgway et al. | 74/493 |
| 2010/0301593 A1* | 12/2010 | Sakata | 280/775 |
| 2013/0174684 A1* | 7/2013 | Burns | 74/493 |
| 2013/0298717 A1* | 11/2013 | Burns et al. | 74/493 |
| 2014/0000405 A1* | 1/2014 | Anspaugh et al. | 74/493 |

\* cited by examiner

STEERING COLUMN TELESCOPE AND E/A LOCKING DEVICE

CROSS-REFERENCES TO RELATED APPLICATIONS

This patent application claims priority to U.S. Provisional Patent Application Ser. No. 61/599,268, filed Feb. 15, 2012, which is incorporated herein by reference in its entirety.

BACKGROUND OF THE INVENTION

The following description relates to an energy absorbing (E/A) locking device in a steering column assembly.

A traditional steering column may be adjustable in a rake direction and/or telescope direction. The steering column may include a locking device which allows or restricts adjustment in a particular direction. For example, when the locking device is in a locked position, adjustment of the steering column may be prohibited. Conversely, when the locking device is moved to an unlocked position, adjustment of the steering column may be allowed. A user may selectively actuate the locking device to an unlocked position to allow adjustment and actuate the locking device to the locked position to restrict adjustment when a desirable position of the steering column has been obtained. Locking devices may also be used to absorb energy within the steering column in a crash or impact scenario.

However, traditional locking devices may require complex manufacturing processes, and may be applied only to a limited number of steering columns for which the locking device is designed.

Accordingly, it is desirable to provide locking device including a sub-assembly that may allow for an off line assembly process, simplified components, and the ability to use a number of the same components between varying programs or steering column assemblies.

SUMMARY OF THE INVENTION

According to an exemplary embodiment of the present invention, there is provided a locking device for a steering column, the locking device including an operating lever configured to rotate between a first position and a second position, an actuating body configured to rotate in response to rotation of the operating lever, a locking cam operably connected to the actuating body and rotatable between a locked position and an unlocked position in response to rotation of the actuating body, the locking cam including an eccentric locking surface having a plurality of locking teeth formed thereon, a locking segment positioned adjacent to the locking cam, the locking strap having a plurality of segment teeth formed thereon, wherein in the locked position the locking teeth of the locking cam engage the segment teeth to restrict adjustment of the steering column in a telescope direction and in the unlocked position, the locking teeth of the locking cam are clear of the segment teeth, and a shaft extending along a first axis, the actuating body and locking cam positioned on the shaft and configured to rotate about the first axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, FIGS. 1-5 show an adjustable steering column assembly 10 including a locking device 120. The locking device 120 is movable between a locked condition where adjustment of the adjustable steering column assembly 10 in a telescope direction is restricted and an unlocked condition where adjustment of the adjustable steering column 10 in the telescope direction is permitted. In addition, in the locked position, the locking device serves to resist force during a crash or impact event where the steering column is configured to collapse.

Figure 1:
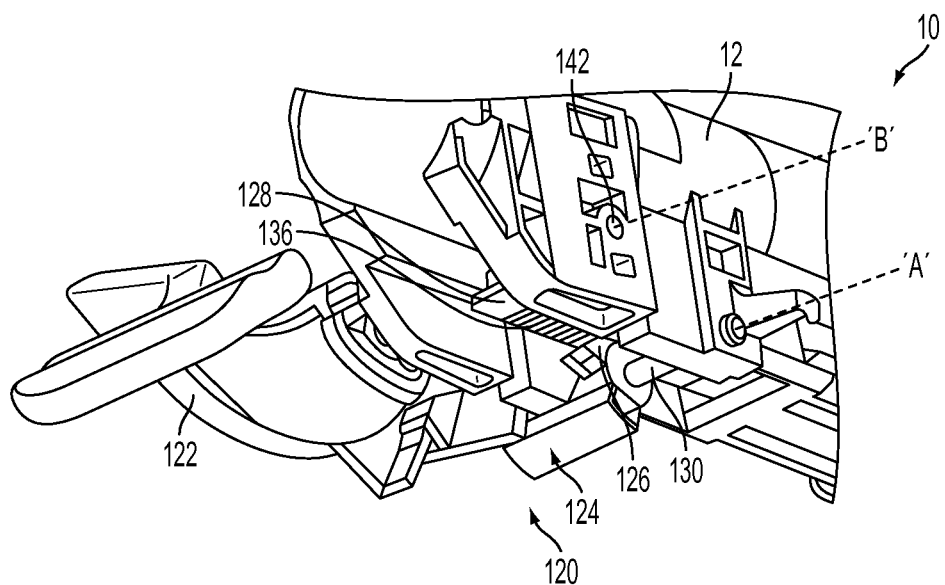
FIG. 1 is a perspective view of a locking device in an adjustable steering column according to an exemplary embodiment of the present invention.

FIG. 1 illustrates the locking device 120 in the adjustable steering column 10 according to an exemplary embodiment of the present invention. In an exemplary embodiment, the locking device 120 includes an operating lever 122, an actuating body 124, a locking cam 126, a locking segment 128, and a shaft 130. In an exemplary embodiment, the locking segment 128 may be formed as an energy absorbing ("E/A") strap or other locking strap, but is not limited thereto. The locking segment 128 may also be formed as a portion of a steering column component, such as a jacket or compression bracket.

The operating lever 122 is operatively connected to the actuating body 124 so that the actuating body 124 rotates in response to rotation of the operating lever 122 to move the locking device 120 between the locked and unlocked conditions. The operating lever 122 is rotatable between a first position and a second position.

The locking cam 126 is operatively connected to the actuating body 124 so that rotation of the actuating body 124 may move the locking cam 126 into and out of locking engagement with the locking segment 128. In an exemplary embodiment, the locking segment 128 is fastened to an adjacent component of the adjustable steering column 10, such as a lower jacket 12 of the steering column 10.

Figure 2:
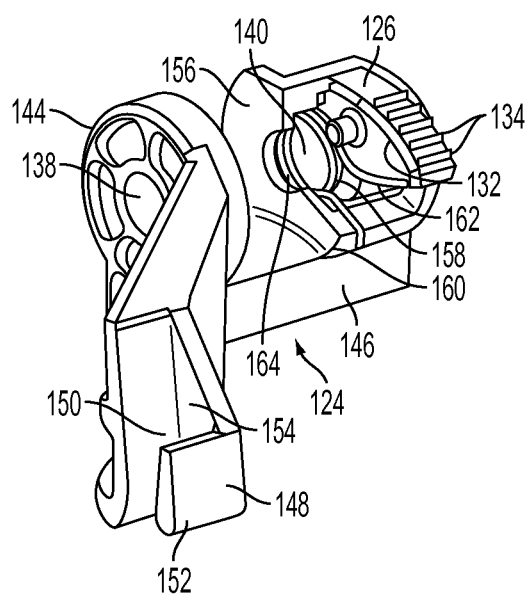
FIG. 2 is a perspective view of the locking device according to an exemplary embodiment of the present invention.

FIG. 2 illustrates a perspective view of the locking device 120 according to an exemplary embodiment of the present invention. With reference to FIGS. 1 and 2, the locking cam 126 includes a locking surface 132 having a plurality of locking teeth 134 formed thereon. The locking segment 128 includes a plurality of segment teeth 136 formed thereon. The locking teeth 134 are configured to selectively engage and disengage the segment teeth 136. The locked condition of the locking device 120 corresponds to a condition where the locking teeth 134 are engaged with the segment teeth 136, while the unlocked condition corresponds to a condition where the locking teeth 134 are disengaged from the segment teeth 136.

With further reference to FIGS. 1 and 2, the shaft 130 extends along a first axis 'A' through a first opening 138 in the actuating body 124 and a second opening 140 in the locking cam 126. The actuating body 124 and locking cam 126 are configured to rotate about the first axis 'A' on the shaft 130.

A rake bolt 142 extends along a second axis 'B', spaced from the first axis 'A'. In an exemplary embodiment, the second axis 'B' extends parallel to the first axis 'A'. The operating lever 122 is operatively connected to the rake bolt 142 and is configured to rotate about the second axis 'B'.

Referring again to FIG. 2, in an exemplary embodiment, the actuating body 124 is formed as a rocker 124. The rocker 124 includes a first arm 144 and a second arm 146. The first opening 138 is formed in the first arm 144. The second arm 146 extends from the first arm 144 and is spaced from the shaft 130. In an exemplary embodiment, the second arm 146 extends generally perpendicular from the first arm 144 and parallel to the shaft 130. Also, in an exemplary embodiment, the first arm 144 extends generally perpendicular to the shaft 130 and first axis 'A'.

A lug 148 extends along at least a portion of a length of the first arm 144. The lug 148 extends outward from the first arm 144 in such a way as to form a first channel 150 between a free end 152 of the lug 148 and the first arm 144. In an exemplary embodiment, the lug 148 may include a base section 154 extending from the first arm 144 and the free end 152 extending from the base section 154 at an angle, so as to form the first channel 150.

The rocker 124 further includes a housing 156 positioned on the second arm 146. The housing 156 at least partially houses the locking cam 126 and may act as a guide to control rotation of the locking cam 126 about the first axis 'A' as described further below.

The locking device 120 also includes a spring 158 positioned on the shaft 130. The spring 158 includes a first tab 160 and a second tab 162. The first tab 160 extends along the housing 156 or the second arm 146. The second tab 162 engages or abuts the locking cam 126. The spring 158 also includes a coil 164 formed between the first tab 160 and the second tab 162. The spring 158 is configured to apply a rotation biasing force to the locking cam 126 to urge the locking cam 126 in a predetermined direction.

Figure 3:
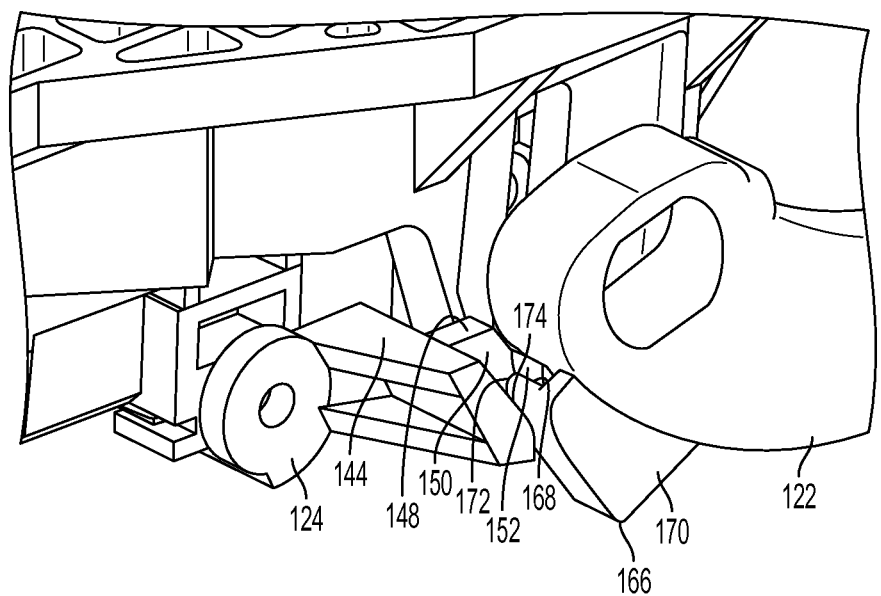
FIG. 3 is a perspective view of an operating lever and actuating body of the locking device according to an exemplary embodiment of the present invention.

FIG. 3 illustrates a perspective view of the operating lever 122 and the actuating body 124 of the locking device 120 according to an exemplary embodiment of the present invention. Referring to FIG. 3, in an exemplary embodiment, a coupling extension 166 extends from the operating lever 122.

The coupling extension 166 extends from the operating lever 122 so as to form a second channel 168 between a portion of the coupling extension 166 and the operating lever 122. In an exemplary embodiment, the coupling extension 166 includes a base section 170 extending from the operating lever 122 and a free end 172 extending from the base section 170 at an angle, thereby forming the second channel 168.

With further reference to FIG. 3, the lug 148 extending from the rocker or actuating body 124 and the coupling extension 166 extending from the operating lever 122 engage to operatively connect the actuating body 124 or rocker to the operating lever 122 such that the actuating body 124 or rocker rotates in response to rotation of the operating lever 122. In an exemplary embodiment, the free end 172 of the coupling extension 166 may be received in the first channel 150 between the lug 148 and the first arm 144 of the rocker 124, and the free end 152 of the lug 148 may be received in the second channel 168 between the coupling extension 166 and the operating lever 122.

The lug 148 and coupling extension 166 are shaped and configured so that rotation of the actuating body 124, and in turn, the locking cam 126, may be controlled by rotation of the operating lever 122. A camming interface 174 is formed along a contact area between the lug 148 and the coupling extension 166. It is understood that a rotational force applied to the actuating body 124 may be varied by manufacturing the camming interface 174 with different profiles. That is, the amount of rotation, i.e., a degree of rotation necessary to actuate the locking cam 126, may be tuned for a particular application during manufacture of the camming interface 174.

Figure 4:
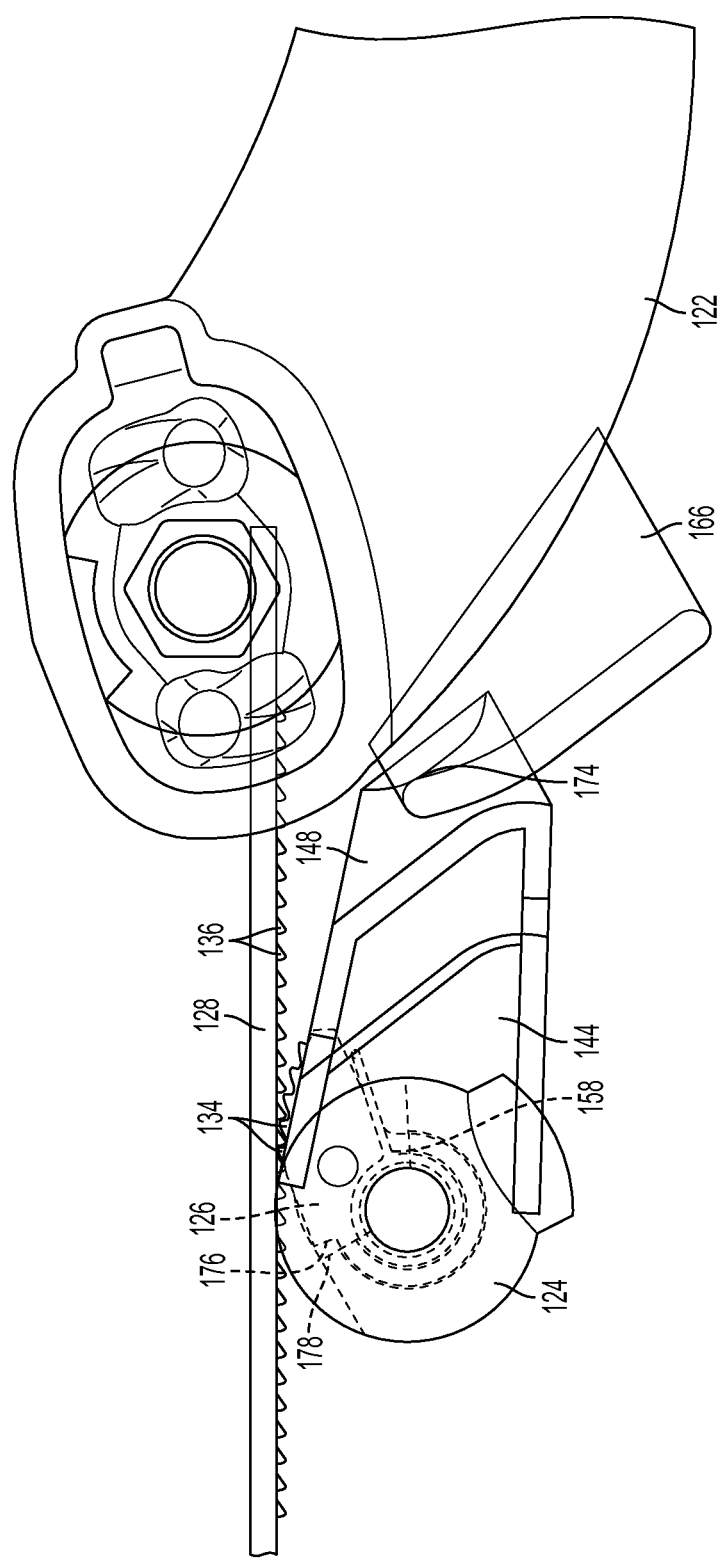
FIG. 4 is a side view of the locking device moved toward a locked position according to an exemplary embodiment of the present invention.
Figure 5:
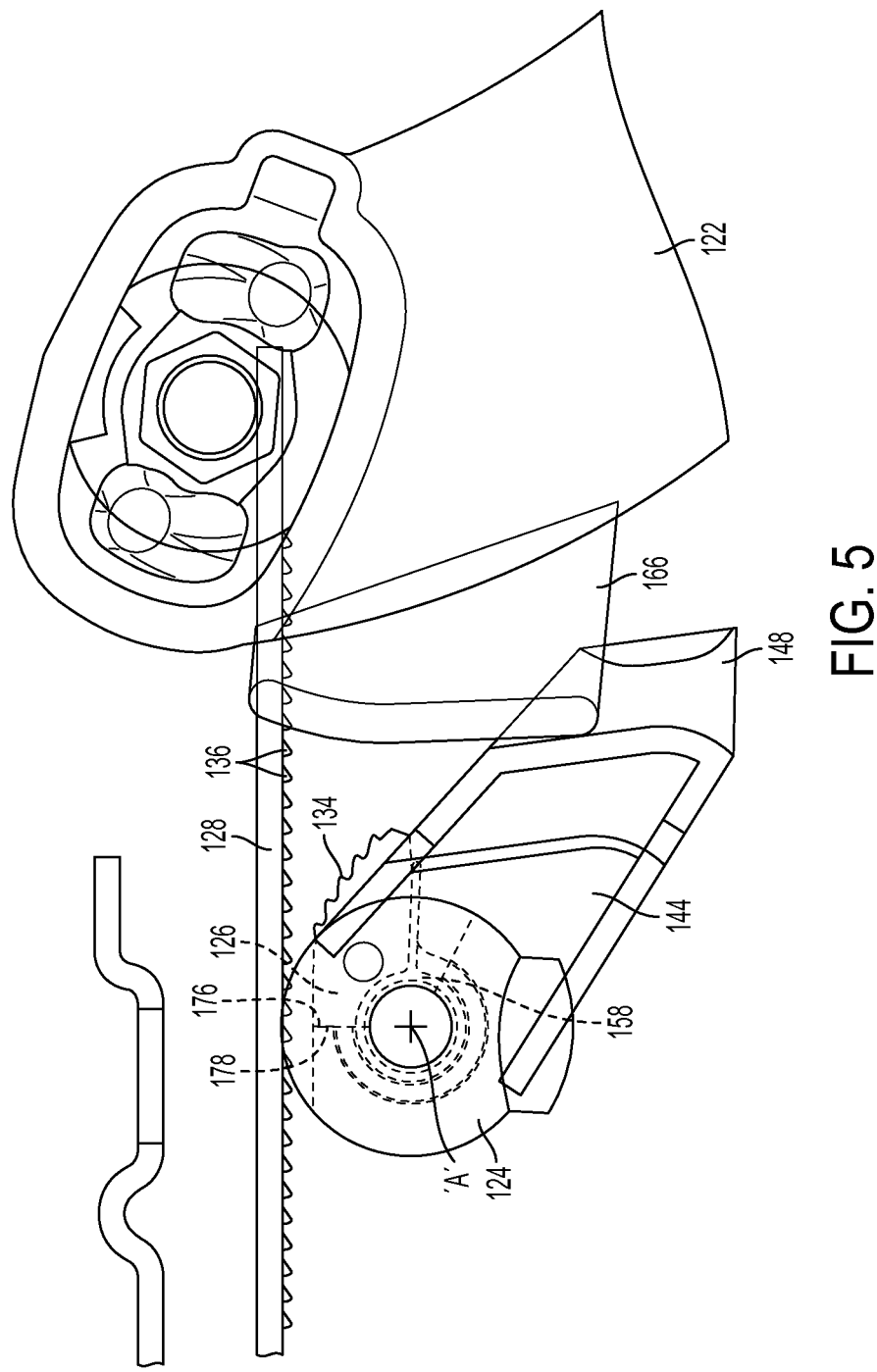
FIG. 5 is a side view of the locking device in an unlocked position according to another exemplary embodiment of the present invention.

FIGS. 4 and 5 illustrate side views of the locking device 120 near a locked position and in an unlocked position, respectively, according to an exemplary embodiment of the present invention. With reference to FIG. 4, the locking cam 126 is urged toward a locked position where the locking teeth 134 of the locking cam 126 engage the segment teeth 136 of the locking segment 128 by the spring 158.

The locking cam 126 includes a shoulder 176 while the housing 156 includes a guide wall 178. In the locked condition, the guide wall 178 and shoulder 176 are spaced apart in a circumferential direction. The actuating body 124 and the housing 156 rotate together in response to rotation of the operating lever 122, due to the operative connection at the camming interface 174 between the lug 148 and coupling extension 166.

Rotation of the operating lever 122 in a first direction causes the actuating body 124 to rotate in a clockwise direction in FIG. 4. With the guide wall 178 spaced from the shoulder 176, the actuating body 124 rotates relative to the locking cam 126 so that the guide wall 178 moves toward the shoulder 176. Further rotation in the clockwise direction causes the guide wall 178 to abut the shoulder 176, thereby causing the locking cam 126 to rotate in the clockwise direction from the locked position to the unlocked position shown in FIG. 5. In the unlocked position, the steering column 10 may be adjusted in the telescope direction.

Rotation of the operating lever 122 in a second direction, opposite to the first direction, causes the actuating body 124 to rotate in a counter clockwise direction. During rotation in the counter clockwise direction, the locking cam 126 rotates with the actuating body 124 under a biasing force of the spring 158 until the locking teeth 134 of the locking cam 126 move into engagement with the segment teeth 136 of the locking segment 128. At this point, the actuating body 124, including the housing 156 may continue rotation in the counter clockwise direction while that locking cam 126 is held against further rotation by the locking segment 128. During this period, the guide wall 178 rotates away from the shoulder 176 to a position shown in FIG. 4.

Figure 6:
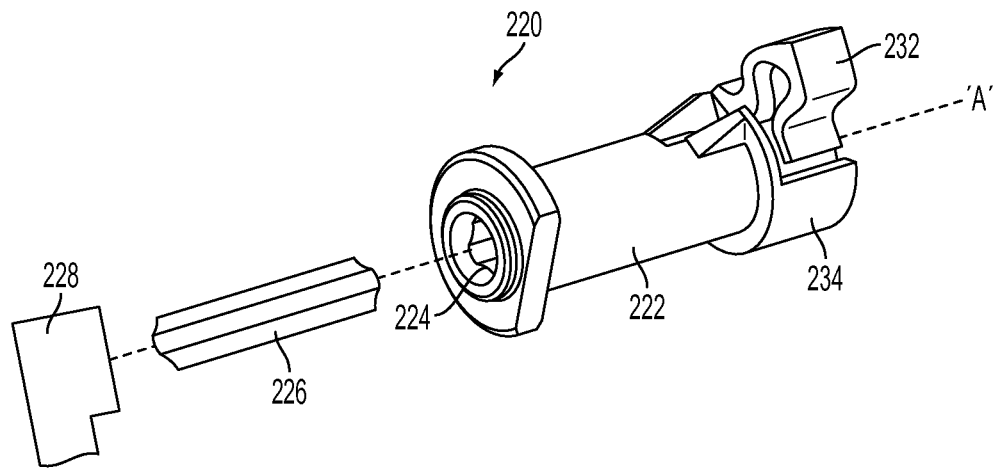
FIG. 6 is a perspective view of a locking device according to another exemplary embodiment of the present invention.
Figure 7:
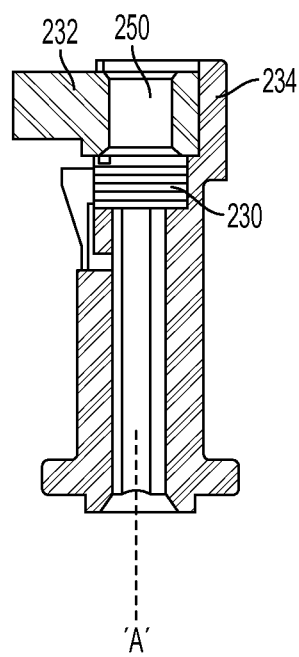
FIG. 7 is a top cross section view the locking device of FIG. 6 according to an exemplary embodiment of the present invention.
Figure 8:
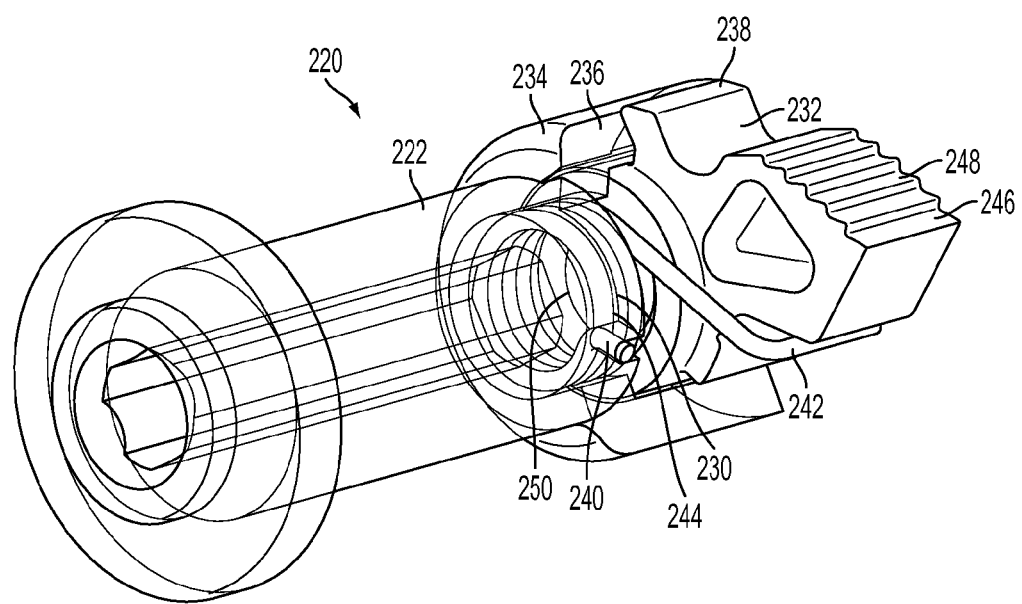
FIG. 8 is a perspective view of the locking device of FIG. 6 according to an exemplary embodiment of the present invention.

FIGS. 6-8 illustrate a locking device for an adjustable steering column according to another exemplary embodiment of the present invention. Description of features in this exemplary embodiment which are similar to the features of the exemplary embodiment above may be omitted. Also, it is understood that where such features are referenced, and not specifically identified or described otherwise in this exemplary embodiment, the features are similar to those described above.

FIG. 6 is a perspective view of a locking device 220 according to another exemplary embodiment of the present invention. In an exemplary embodiment, the actuating body 222 may be formed as a sleeve 222. The sleeve 222 includes an opening 224 extending therethrough configured to receive a shaft 226 therein.

The shaft 226 extends along the first axis 'A'. In an exemplary embodiment, the shaft 226 has a non-circular cross section. The operating lever 228 is operatively coupled to the shaft 226. The shaft 226 rotates in response to rotation of the operating lever 228. The opening 224 of the sleeve 222 is keyed to the shaft 226 so that the shaft 226 and the sleeve 222 rotate together.

FIG. 7 shows a top cross section view of the locking device 220 of FIG. 6 according to an exemplary embodiment of the present invention. With reference to FIG. 7, a spring 230 is positioned between the sleeve 222 and the locking cam 232. The spring 230 is configured to urge the locking cam 232 in a predetermined direction.

FIG. 8 shows a perspective view of the locking device 220 of FIG. 6 according to an exemplary embodiment of the present invention. Referring to FIG. 8, the sleeve 222 includes a housing 234 formed at one end. The housing 234 is configured to at least partially house the locking cam 232. In an exemplary embodiment, the housing 234 is formed of an increased diameter section extending partially around the first axis 'A'. The housing 234 extends partially circumferentially about the locking cam 232. A guide wall 236 on the housing 234 is configured to selectively engage a shoulder 238 of the locking cam 232 to cause the locking cam 232 to rotate with the sleeve 222 and housing 234. The housing 234 may be formed integrally with the sleeve 222 and rotate therewith.

The spring 230 includes a first tab 240 configured to engage the sleeve 222 and a second tab 242 configured to engage or abut the locking cam 232. The spring 230 also includes a coil portion 244 formed between the first tab 232 and the second tab 234. The spring 230 is configured to bias the locking cam 232 toward the locked position.

The locking cam 232 is similar to the locking cam 126 described with reference to FIGS. 1-5 above. The locking cam 232 includes a locking surface 246 having the locking teeth 248 formed thereon. The locking surface 246 and locking teeth 248 are eccentrically formed on the locking cam 232. The locking teeth 248 are configured to selectively engage and disengage the segment teeth 136 of the locking segment 128 as described above and shown in FIGS. 1, 4, and 5. The locking cam 232 is in the locked position when the locking teeth 248 engage the segment teeth 136 and an unlocked position when the locking teeth 248 are disengaged from the segment teeth 136. The locking cam 232 also includes an opening 250 (see also FIG. 7) through which the shaft 226 extends. In an exemplary embodiment, the opening 250 of the locking cam 232 is not keyed to the shaft 226 so that the locking cam 232 may rotate independently of the shaft 226.

In operation, with the locking cam 232 in the locked position, the operating lever 228 is rotated in a first direction, causing the shaft 226, sleeve 222 and housing 234 to rotate in the first direction as well. The guide wall 236 of the housing 234 is initially spaced from the shoulder 238 of the locking cam 232 and rotates relative to the locking cam 232 toward the shoulder 238 in the first direction. The guide wall 236 comes into contact with the shoulder 238 and causes the locking cam 232 to rotate together with the housing 234 and sleeve 222. During this period, the locking teeth 248 of the locking cam 232 rotate away from locking engagement with the segment teeth 136 (see FIGS. 1, 4 and 5) to the unlocked position. In the unlocked position, the adjustable steering column 10 may be adjusted in the telescope direction.

Rotation of the operating lever 228 in a second direction, opposite to the first direction, causes the sleeve 222 to rotate in the second direction. During rotation in the second direction, the locking cam 232 rotates with the sleeve 222 under the biasing force of the spring 230 until the locking teeth 248 of the locking cam 232 move into engagement with the segment teeth 136 of the locking segment 128. At this point, the sleeve 222, including the housing 234 may continue to rotate in the second direction while that locking cam 232 is held against further rotation by the locking segment 128. During this period, the guide wall 236 rotates away from the shoulder 238.

Figure 9:
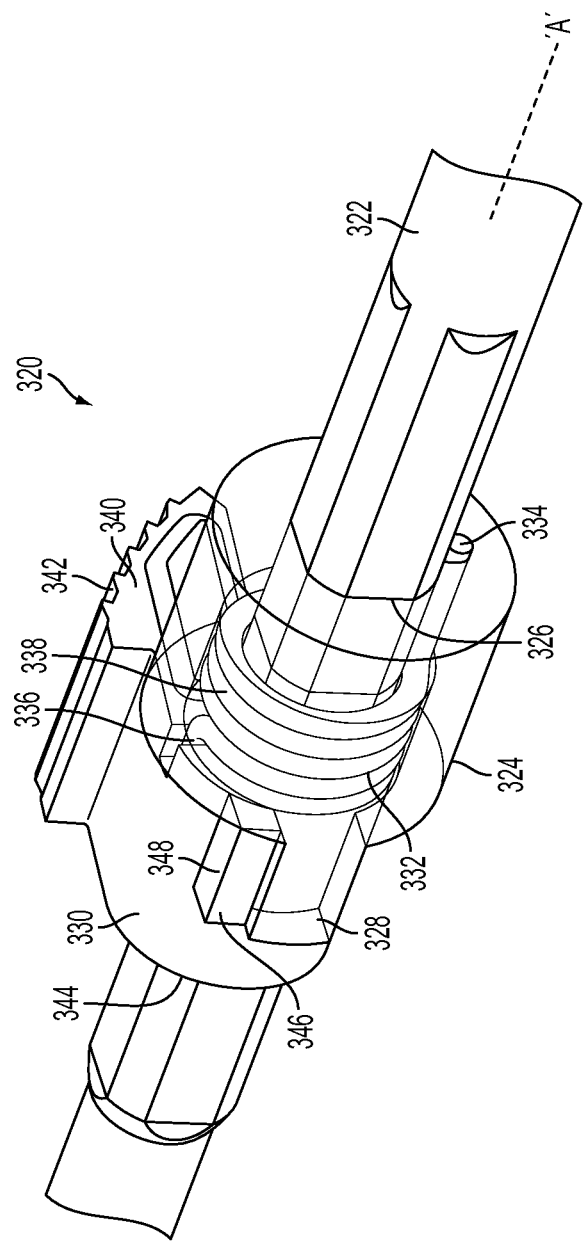
FIG. 9 is a perspective view of a locking device positioned on a shaft according to still another exemplary embodiment of the present invention.
Figure 10:
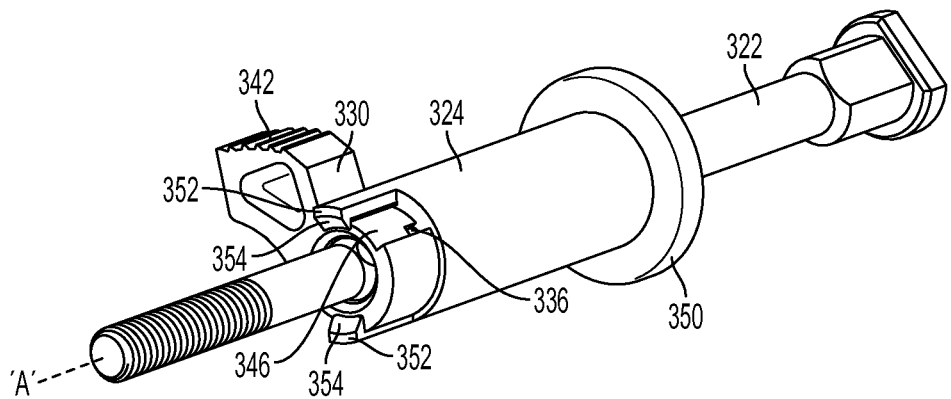
FIG. 10 is a perspective view of a variation of the locking device of FIG. 9 according to an exemplary embodiment of the present invention.
Figure 11:
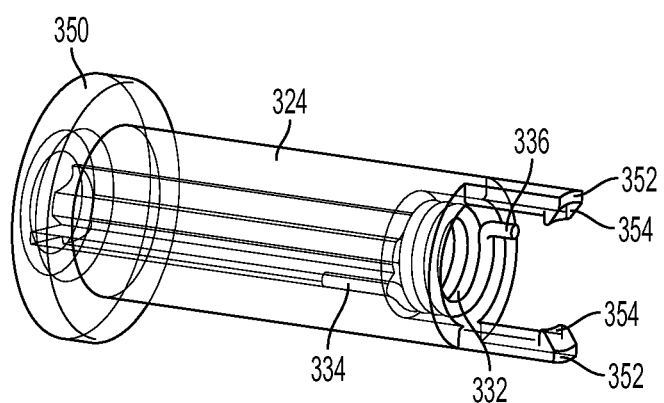
FIG. 11 is a perspective view of a portion of the locking device of FIG. 10 according to an exemplary embodiment of the present invention.

FIGS. 9-11 illustrate another exemplary embodiment of a locking device 320. Description of features in this exemplary embodiment which are similar to the features of the exemplary embodiments above may be omitted. It is understood that where such features are referenced, and not specifically identified or described otherwise in this exemplary embodiment, the features are similar to those described above.

FIG. 9 is a perspective view of the locking device 320 positioned on a shaft according to still another exemplary embodiment of the present invention. In an exemplary embodiment, the shaft 322 extends along the first axis 'A' and is formed with a non-circular cross section along at least a portion thereof. The operating lever 228 (FIG. 6) is coupled to the shaft 322 so that the shaft 322 rotates in response to rotation of the operating lever 322, as described in the embodiment shown in FIGS. 6-8.

The actuating body 324 is a formed as a sleeve 324 having an opening 326 extending therethrough. The opening 326 is keyed to the shaft 322, i.e., has a non-circular cross section similar to that of the shaft 322 so that the sleeve 324 rotates together with the shaft 322. The sleeve 322 includes at least one arm 328 extending therefrom configured to engage the locking cam 330. In an exemplary embodiment, the at least one arm 328 extends in the direction of the first axis 'A'.

The spring 332 is positioned between the sleeve 324 and the locking cam 330. The spring 332 includes a first tab 334 extending along the sleeve 324 and a second tab 336 engaging the locking cam 330. The spring 332 also includes a coil 338 positioned between the first tab 334 and second tab 336. The spring 332 is configured to urge the locking cam 330 in a predetermined direction.

The locking cam 330 includes a locking surface 340 having a plurality of locking teeth 342 formed thereon. The locking surface 340 is formed as an eccentric surface on the locking cam 330. The locking teeth 342 are configured to selectively engage and disengage the segment teeth 136 of the locking segment 128 as described above. The locking cam 330 also includes an opening 344 through which the shaft 322 extends. In an exemplary embodiment, the opening 344 is not keyed to the shaft 322 so that the locking cam 330 may rotate relative to the shaft 322 or vice versa.

The locking cam 330 also includes an operating groove 346 formed in an outer surface. The operating groove 346 receives the at least one arm 328 of the sleeve 324. The at least one arm 328 is movable within the operating groove 346 in a circumferential direction when the sleeve 324 rotates relative to the locking cam 330.

In operation, with the locking cam 330 in the locked position, the operating lever 228 is rotated in a first direction, causing the shaft 322, sleeve 324 and at least one arm 328 to rotate in the first direction as well. The at least one arm 328 moves within the operating groove 346 toward a first end 348 of the operating groove 346. The at least one arm 328 comes into contact with the first end 348 of the operating groove 346 and causes the locking cam 330 to rotate together with the at least one arm 328 and the sleeve 324. During this period, the locking teeth 342 of the locking cam 330 rotate away from locking engagement with the segment teeth 136 to the unlocked position. In the unlocked position, the adjustable steering column may be adjusted in the telescope direction.

Rotation of the operating lever 228 in a second direction, opposite to the first direction, causes the sleeve 324 to rotate in the second direction. During rotation in the second direction, the locking cam 330 rotates with the sleeve 324 under the biasing force of the spring 332 until the locking teeth 342 of the locking cam 330 move into engagement with the segment teeth 136 of the locking segment 128. At this point, the sleeve 324, including the at least one arm 328 may continue to rotate in the second direction away from the first end 348 of the operating groove 346 while the locking cam 330 is held against further rotation in the second direction by the locking segment 128.

FIGS. 10 and 11 illustrate a variation of the locking device shown in FIG. 9, according to an exemplary embodiment of the present invention. Referring to FIGS. 10 and 11, in an exemplary embodiment, the sleeve 324 may additionally include a collar 350. Further, the at least one arm may include two arms 352. In an exemplary embodiment, the two arms 352 may be positioned on diametrically opposite sides of the sleeve 324. Further, the arms 352 may extend completely across the locking cam 330 in the direction of the first axis 'A'. A locking end 354 on each arm 352 may serve as an axial retainer for the locking cam 330, to maintain an axial position of the locking cam 330 relative to the sleeve 324.

The locking cam 330 is the same as the locking cam 330 described above with reference to FIG. 9. However, in an exemplary embodiment, the operating groove 346 of the locking cam may extend completely across the locking cam 330 in the direction of the first axis 'A'. At least one of the arms 352 is received in the operating groove 346 and is configured to move within the operating groove 346 when the sleeve 324 rotates relative to the locking cam 330, similar to the at least one arm 328 in the operating groove 346 described above with reference to FIG. 9.

In addition, with reference to FIGS. 10 and 11, it is understood that the shape of the locking cam may be varied for particular applications while keeping its eccentric configuration. Locking and unlocking of the locking device is carried out in a manner similar to that described above with reference to FIG. 9.

Also, it is understood that in the exemplary embodiments above the locking segment may be implemented as an energy absorbing (E/A) strap with the segment teeth formed thereon. With the locking device 120, 220, 320 in the locked position, force is resisted during a crash or impact event. In the event of a crash or impact, engagement between the locking teeth of the locking cam and the segment teeth of the E/A strap may cause the E/A strap to unroll therefore allowing the adjustable steering column collapse. The amount of force required for the steering column to collapse is typically high, and is exerted on the steering column in crash or impact situations, rather than during normal adjustment operation by a user.

In the exemplary embodiment described above, a locking cam, spring and actuating body may be integrated into one sub-assembly to facilitate an off line assembly process. This allows for a simplified locking cam. Additionally, if desired, a common locking cam may be used between multiple programs.

It is understood that various features described in the different exemplary embodiments above are not limited only to the embodiment in which they are described. Rather, certain features may be common to all exemplary embodiments, or may be used interchangeably among the different exemplary embodiments. For example, the locking cam and actuating body described with reference to the exemplary embodiment in FIGS. 6-11 may be used with the locking device described with reference to the exemplary embodiment in FIGS. 1-5, and may be positioned along the first axis 'A' or the second axis 'B'.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A locking device for a steering column comprising:
an operating lever configured to rotate between a first position and a second position;
an actuating body configured to rotate in response to rotation of the operating lever;
a locking cam operably connected to the actuating body and rotatable between a locked position and an unlocked position in response to rotation of the actuating body, the locking cam including an eccentric locking surface having a plurality of locking teeth formed thereon;
a locking segment positioned adjacent to the locking cam, the locking segment having a plurality of segment teeth formed thereon, wherein in the locked position the locking teeth of the locking cam engages the segment teeth to restrict adjustment of the steering column in a telescope direction and in the unlocked position the locking teeth of the locking cam are clear of the segment teeth;
a shaft extending along a first axis, the actuating body and locking cam positioned on the shaft and configured to rotate about the first axis; and
a spring positioned on the shaft and configured to apply a rotational biasing force to the locking cam.

2. The locking device of claim 1, wherein the locking cam includes an opening formed therein through which the shaft extends.

3. The locking device of claim 2, further comprising a rake bolt extending along a second axis spaced from the first axis, wherein the rake bolt is operably connected to the operating lever and the operating lever is rotatable about the second axis.

4. The locking device of claim 3, wherein the actuating body is a rocker having a first arm and a second arm, the first arm having an opening formed therein through which the shaft extends and the second arm extends from the first arm spaced from the shaft.

5. The locking device of claim 4, wherein the second arm extends perpendicularly from the first arm and parallel to the shaft.

6. The locking device of claim 4, wherein the first arm comprises a lug extending therefrom, the lug extending along at least a portion of a length of the first arm and configured to form a channel between the first arm and the lug.

7. The locking device of claim 6, wherein the operating lever comprises a coupling extension extending therefrom, the coupling extension configured to be received in the channel formed between the first arm and the lug and to act on the lug to cause the rocker to rotate in response to rotation of the operating lever.

8. The locking device of claim 7, wherein the lug and coupling extension contact one another at a camming interface.

9. The locking device of claim 8, wherein the rocker further comprises a housing positioned on the second arm, the locking cam positioned at least partially in the housing.

10. The locking device of claim 9, wherein the spring includes a first tab extending along the housing, a second tab in contact with the locking cam and a coil portion formed between the first tab and second tab.

11. The locking device of claim 2, wherein the operating lever is operably connected to the shaft and is rotatable about the first axis.

12. The locking device of claim 11, wherein the actuating body is a sleeve and includes an opening through which the shaft extends.

13. The locking device of claim 12, wherein the sleeve comprises a housing and the locking cam is positioned at least partially in the housing.

14. The locking device of claim 13, wherein the spring includes a first tab extending along the housing and a second tab in contact with the locking cam and a coil portion is formed between the first tab and second tab 15. The locking device of claim 12, wherein the sleeve includes a first arm extending in a direction of the first axis, the first arm configured to engage the locking cam.

16. The locking device of claim 15, wherein the locking cam includes an operating groove and the first arm is positioned within the operating groove.

17. The locking device of claim 16, wherein the spring includes a first tab extending along the shaft and within the sleeve and a second tab in contact with the locking cam and a coil portion is formed between the first tab and second tab.

18. The locking device of claim 1, wherein the locking segment is an energy absorbing strap configured to allow the steering column to collapse upon application of a predetermined amount of force with the locking device in the locked position.

19. The locking device of claim 1, wherein the actuating body further includes a guide wall and the locking cam further includes a shoulder, wherein rotation of the actuating body in a first direction causes the guide wall to rotate toward, and come into contact with, the shoulder of the locking cam so that the locking cam rotates together with the actuating body, and rotation of the actuating body in a second direction, opposite to the first direction, causes the guide wall to rotate away from the shoulder such that the guide wall is spaced from the shoulder and the actuating body rotates relative to the locking cam.

* * * * *